United States Patent [19]  
Sapieha et al.

[11] 4,407,852  
[45] Oct. 4, 1983

[54] ELECTRETS FROM PLASMA POLYMERIZED MATERIAL

[76] Inventors: Slawomir W. Sapieha, 3380 Edouard Montpetit Blvd., Apt. 305, Montreal, Quebec, Canada; Michael R. Wertheimer, Privada Clavel 121, Cuernavaca, Morelos, Mexico

[21] Appl. No.: 197,599

[22] Filed: Oct. 16, 1980

[30] Foreign Application Priority Data

Oct. 19, 1979 [CA] Canada .................................. 337980

[51] Int. Cl.³ ............................................ G11C 13/02
[52] U.S. Cl. ..................................... 427/41; 307/400; 427/39; 427/40; 427/100
[58] Field of Search ..................... 427/39, 40, 41, 100; 307/400

[56] References Cited

U.S. PATENT DOCUMENTS 3,924,324 12/1975 Kodera .......................... 307/400 X
4,291,245 9/1981 Nowlin et al. ..................... 307/400

FOREIGN PATENT DOCUMENTS 137168 8/1979 Fed. Rep. of Germany ...... 307/400

Primary Examiner—James R. Hoffman  
Attorney, Agent, or Firm—Watson, Cole, Grindle & Watson

[57] ABSTRACT

This invention relates to electrets which comprise a film of plasma polymerized dielectric material having a volumetric space charge.

20 Claims, 3 Drawing Figures

ELECTRETS FROM PLASMA POLYMERIZED MATERIAL

The present invention relates to electrets and more particularly, relates to electrets of material formed during plasma polymerization of thin films and methods for their manufacture.

Electrets and methods of manufacturing electrets are known in the art. Electrets have many known uses and a number of electret devices have been proposed. For example, electrets are widely used in transducers and particularly microphones where they are noted for their excellent electroacoustical characteristics. Other uses include radiation detectors, dosimeters, filters, memory storage units, vibration detectors, humidity meters, pressure gauges, electro-statics relays, DC and AC motors, current generators, voltage generators, electron beam deflectors, biomedical applications, etc. The manufacture of electrets has been the subject of considerable research and various methods for their manufacture have been proposed and are currently commercially employed. Included among the methods is the thermo electrical method utilizing the simultaneous application of heat and an electric field, the corona discharge method, and the electron bombardment method wherein an electron beam is focused and accelerated to a dielectric foil which is then bombarded with the electrons for a desired period of time. Some electrets are formed such that the material carries two surface charges of opposed nature on opposed surfaces. However, it is possible to produce a "monocharge" electret as, for example, with the use of the electron bombardment method. This bombardment method has several advantages in that it is highly reproducible and one may, to a certain extent, control the depth of the charge in the electret. A monocharged electret is desirable for certain uses including transducers.

As above mentioned, most electrets carry what is essentially a surface charge. For many devices using electrets, it would be desirable to "distribute" the charge throughout the thickness of the electret film since this would provide a greater charge capability for a given volume.

It is accordingly an object of the present invention to provide improved devices utilizing electrets wherein the electret has a nearly uniform volumetric space charge compared to more conventional surface charge electrets.

It is also an object of the present invention to provide a method of manufacturing an electret which has a nearly uniform volumetric space charge.

According to one aspect of the present invention, in a device utilizing an electret, there is provided the improvement wherein the electret comprises a film of a plasma polymerized dielectric material having a substantially uniform volumetric space charge.

According to a further aspect of the present invention, there is provided a method of manufacturing an electret comprising the steps of providing a substrate and depositing on said substrate a plasma polymerized material.

In a still further aspect of the present invention, in a transducer having a backplate, and an electret adjacent thereto, there is provided the improvement wherein said electret comprises a film of a plasma polymerized dielectric material having a nearly uniform volumetric space charge.

In a still further aspect of the present invention, in a transducer including a backplate, an electret on one side of said backplate, and a diaphragm, there is provided the improvement wherein said electret comprises a film of a plasma polymerized dielectric material having a nearly uniform volumetric space charge.

In greater detail, the electrets produced according to the present invention comprise a thin film of a plasma polymerized material which is conventionally deposited on a substrate. As previously discussed, plasma polymerization per se is well known in the art; a plasma is a partially ionized gas generally composed of ions, electrons and neutral species. The plasma may be generated by different techniques; the technique frequently used is the glow discharge technique in which free electrons gain energy from an imposed electrical field and subsequently lose it through collisions with neutral molecules in the gas. The frequencies employed during the plasma polymerization may range between 0 Hz and 30 GHz (a.c.) with a preferred embodiment of the present invention employing frequencies in the audio frequency up to the microwave range (50 Hz to 10 GHz). In the latter instance, generation of the plasma to form the electret in a large volume microwave plasma apparatus such as disclosed in Canadian Pat. No. 972,479 is preferred.

The materials which may be employed for electrets are well known in the art and a wide variety of organic, organometallic, and in some instances, inorganic materials are known which can be polymerized to form a thin film on a substrate placed in a glow discharge. One of the advantages of plasma polymerization is that monomers need not necessarily possess reactive functional groups to be polymerizable. Thus, ethane and benzene have been readily polymerized in a plasma.

The functional parameters of the polymerization process for forming the electret depend on many different factors. Thus, for example, the rate of plasma polymerization depends on the nature of the monomer gas, the flow rate, pressure, power, substrate temperature, frequency, electrode gap, and reactor configuration. These parameters are well known in the art and need not be discussed in great detail herein.

As previously discussed, the materials utilized in the manufacture of the electrets may be selected from many dielectric materials known in the art. Basically, if the dielectric material can be plasma polymerized, it is suitable in the practice of the present invention; preferred materials include any dielectric having an electrical conductivity of less than or equal to about $10^{-15}$ reciprocal ohm-centimeters including aromatic or aliphatic hydrocarbons, halocarbons, etc.

The electret is deposited on a suitable substrate, the material of which and the thickness of which may vary according to those teachings known to those skilled in the art. When electrodes are employed, the substrate may be mounted on the electrode and the vapour is deposited thereon to form the thin film electrets or one may use a dielectric support and a thin metal electrode. In electrodeless methods such as taught in the aforementioned Canadian Patent, a substrate may be placed in the apparatus upon which the thin film electret is formed.

During the formation of the thin film electret, the substrate may be heated or cooled to a desired temperature which may vary between liquid helium temperature and 1000° C. Similarly, the power density may vary according to the final properties decided in the film; typically, such power densities may range between 0.001 watts per cm$^3$ and 100 watts per cm$^3$ with a preferred range being between 0.01 and 10 watts per cm$^3$.

Electrical biasing of the substrate may be desirable and in some instances, such as in typical commercial radio frequency generators, is accomplished by the use of the electrodes in the apparatus. Thus, an electroded radio frequency apparatus having a positively biased electrode and a second electrode at a floating potential produces a thin film on the positive electrode which has electrostatic charges of a negative sign. Employing a microwave plasma generating apparatus such as disclosed in the aforementioned Canadian patent produces a thin film electret having a positive sign. The electrostatic charge on the electret can be varied according to variations in the type of apparatus and biasing of the film; biasing electrodes may be utilized in the microwave apparatus.

In one particular aspect of the present invention, plasma polymerized electret film may be further treated by conventional methods. Thus, the film may be subjected, if desired, to a corona discharge or like treatment. Still further, in one attractive embodiment, the plasma polymerized electret film may be formed of a polar material whereby the film is deposited onto an electrically biased, heated substrate, or the film may subsequently be subjected to a thermo-electric treatment wherein the film is heated, subjected to an electric field and then cooled while under the influence of the field. Still further, in the formation of the film, a magnetic field may be used to modify the distribution of the power density in the glow discharge.

The plasma polymerized electret film need not necessarily be of a uniform thickness. Indeed, it may be desirable for certain applications to vary the thickness of the film at desired locations. Due to the uniform volume distribution of charges throughout the thickness of the film, the electrostatic potential at different locations on the film can be varied merely by a variation in the thickness thereof.

In a further embodiment, the electrets may be formed of a "laminated" structure wherein several layers of the same which are different plasma polymerized film may be deposited on each other. Thus, the "laminate" may be manufactured to have desired properties.

As previously mentioned, the electret formed according to the present invention is susceptible of many uses. A prime commercially important use is in the transducer field including electro-acoustic and electro-mechanical transducers. In particular, an electret according to the present invention is particularly suitable for use in microphones or like transducers. Thus, in one type of transducer, the non-metallized surface of a foil electret is placed next to a backplate leaving a shallow air gap controlled by rigid raised points on the backplate surface which is either of a metal disc or metal-coated dielectric. The gap is connected to a larger air cavity by means of small holes through the backplate. A diaphragm of suitable material (e.g. teflon) is given suitable charge. The electret microphone thus functions as a condenser microphone with solid dielectric.

In further modifications known in the art, a metallic backplate is coated with an electret foil (film) while a diaphragm of a material which is only required to have the necessary physical properties is stretched over the back plate. The advantage of this arrangement is that one can select the diaphragm solely for its mechanical properties and not for its properties as an electret. A "push-pull" transducer using monocharged electrets is known in the art. Such transducers allow large dynamic electret deflections and are suitable for the measurement or generation of large amplitude acoustic signals.

Electrets according to the present invention have changes which, under the right circumstances, decay very slowly. In particular, electret films which have been plasma polymerized in the microwave frequency range have a very slow decay rate including an initial slow decay rate.

The present electret can be implemented in all configurations described above.

In further detail, plasma polymerized electret films were produced from several different "monomers" including hexamethyldisiloxane (HMDOS), silane ($SiH_4$), ethylene, styrene, tetrafluoroethylene, and others.

Three types of plasma apparatus were used to produce the present films: electroded audio (50 Hz to 45 KHz) and r.f. (10 MHz) apparatus, the sample substrates (Al foil) were mounted on the biased electrode. The second unit was an electrodeless "Large volume microwave plasma" (LMP) apparatus (as taught in Canadian Pat. No. 972,479) operating at 2.45 GHz. In the case of this latter unit, the substrate temperature could be varied from room temperature up to several hundred degrees Celsius; films were deposited either on Al foil (at 25° C.) or on 50 μm thick "Kapton" sheet (at 25° C. or at 250° C.). Film thicknesses, which are of great importance, were determined carefully by multiple-beam interferometry on reference substrates of glass and also verified gravimetrically using density values determined by the inventors. Apart from the discharge frequency and substrate temperature, already mentioned, other fabrication parameters were the power (or power density) absorbed in the plasma (approximately 0.1 W cm$^{-3}$), and the "monomer" pressure (typically a few tenths of a torr).

Following glow discharge polymerization, films were removed from the reactor to atmosphere and subjected to surface potential, or thermally stimulated current (TSC) and thermally stimulated voltage decay (TSVD) measurements, the former using the static electrode probe method. In the Figures.

Figure 1:
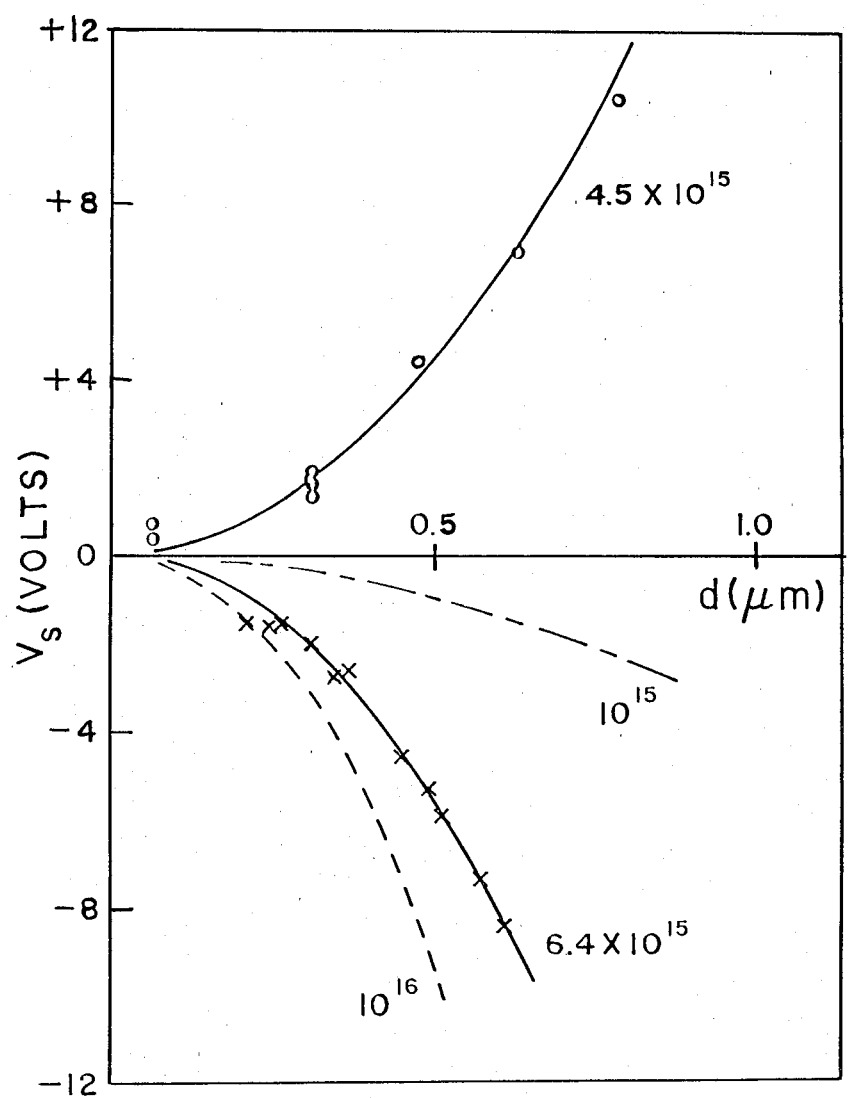
FIG. 1 is a graph plotting the surface potential ($V_s$) versus thickness for plasma polymerized film with the upper portion referring to films produced by microwave discharge, whereas the lower portion refers to those produced in the radio frequency discharge.

Surface potential measurements show that thin films produced by plasma polymerization bear electrostatic charges. For example, the HMDSO films produced in the r.f. apparatus with biased electrodes were found to have charges of opposite (negative) sign to those produced in the microwave plasma. This is shown in FIG. 1. Whereas the negative charge initially decays exponentially (time constant ≈ 14 minutes), both types of charges subsequently decay quite slowly, and a residual surface potential of several volts may be observed even a few months after polymerization. Although FIG. 1 shows relatively low surface potentials, values as high as 185 volts were obtained under appropriate fabrication conditions.

Of considerable interest is the dependence of the surface potential upon sample thickness: the general solution of Poisson's equation:

$$\frac{d^2V}{dX^2} = -\frac{\rho(X)}{\epsilon'} \quad (1)$$

where X is the thickness coordinate, $\rho(X)$ the space charge density, $\epsilon'$ the permittivity of the dielectric, is $$V_s = \frac{1}{\epsilon'}\left(\sigma_o d + \int_0^d dX \int_0^X \rho(X')dX'\right) \quad (2)$$

d being the film thickness. In the case in which the dielectric film bears only a surface charge (of density $\sigma_o$), the second term in the backet disappears, whereas if the dielectric contains only a uniform, volumetric space charge $\rho_o$, then (2) becomes:

$$V_s = \frac{\rho_o}{2\epsilon'} d^2 \quad (3)$$

Figure 2:
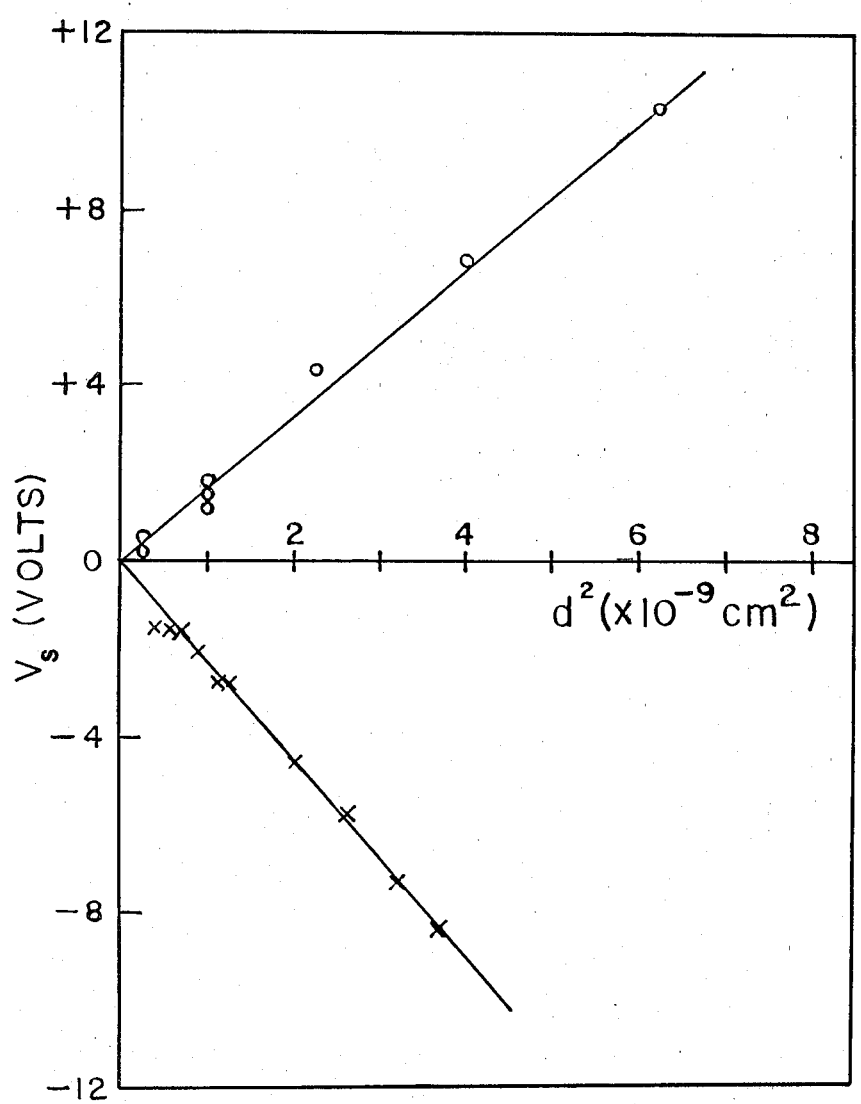
FIG. 2 is a graph plotting $V_s$ (surface potential) versus $d^2$ (film thickness) for the data shown in FIG. 1.

In FIG. 2 the surface potential is plotted versus $d^2$, for the HMDSO samples from FIG. 1. Since the plot is linear and passes through the origin, in accordance with equation (3), it may be concluded that the films contain a uniform volumetric space charge. The continuous lines through the data points in FIG. 2, and the parabolic curves in FIG. 1, correspond to equation (3) in which $\epsilon'/\epsilon_0 = 2.5$, and where appropriate values have been substituted for $\rho_o$. On this basis, it is found that for the microwave and radiofrequency films $\rho_o = +4.5 \times 10^{15}$ and $-6.4 \times 10^{15}$ electron charges per cm$^3$, respectively. For a 2000 Å-thick sample, a similar surface potential would be obtained for a surface charge density of $|\sigma_o| \approx 10^{-8}$ C cm$^{-2}$.

Figure 3:
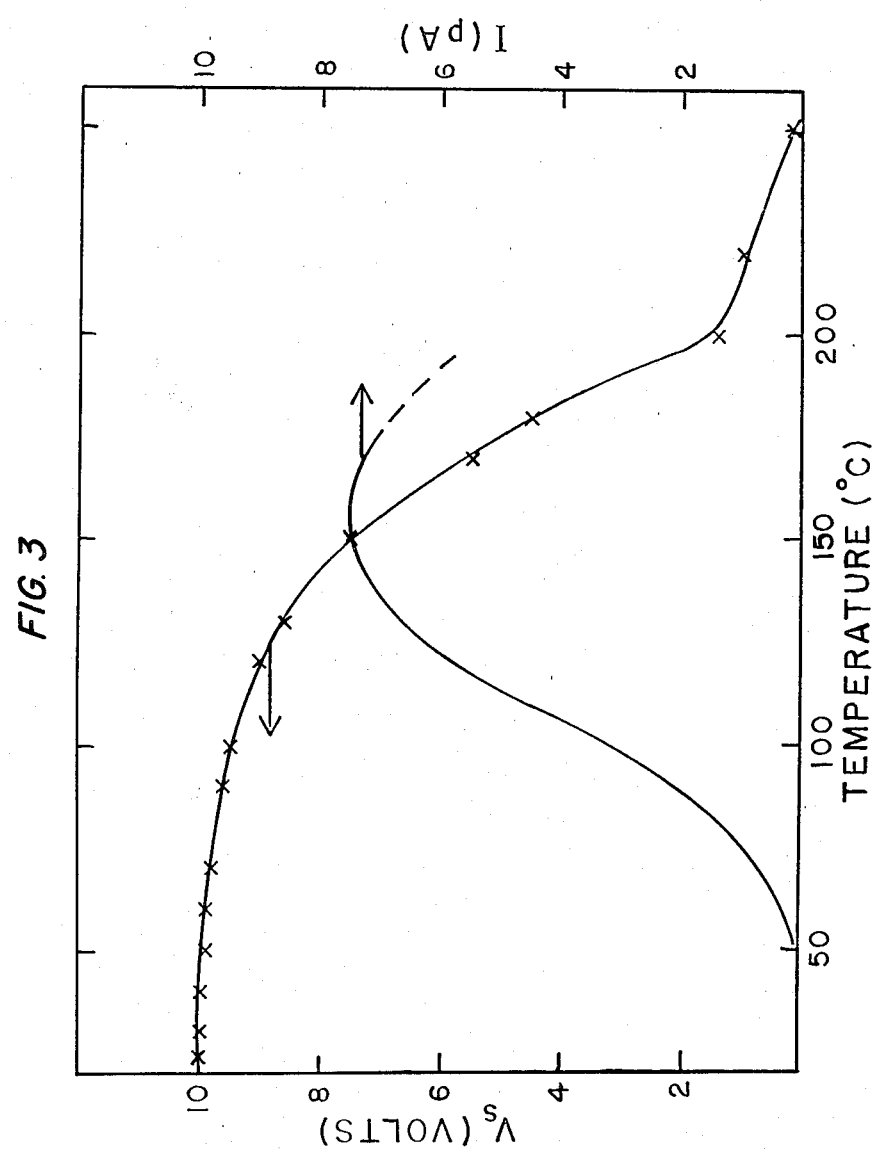
FIG. 3 is a plot of surface potential ($V_s$) and thermally stimulated current I, versus temperature for an 8,000 Å-thick HMDSO sample.

Qualitatively similar results have been obtained for the case of films formed from other "monomers". TSVD and TSC measurements have been performed for HMDSO samples. FIG. 3 shows both types of measurements for a typical 8000 Å thick HMDSO film. Appreciable discharging is seen to begin at about 100° C., but trapped charge can still be detected near 220° C.; a sample maintained isothermally at 160° C. for 2 hours lost only approximately 50% of its initial charge. The TSC spectrum shows a single, broad peak centered at about 160° C., that is, near the inflexion point of the TSVD curve.

The shapes of the two curves in FIG. 3 suggest a broad distribution of charge traps in PP-HMDSO, rather than a few discrete trap levels which are usually observed in the case of conventional polymeric electrets.

Plasma polymer films, produced by high frequency glow discharges, contain uniformly distributed volumetric space charges; this is unlike conventional polymer electret foils, produced by corona or electron beam charging, where the space charge tends to be restricted to a shallow depth within the surface, typically a few micrometers or less.

The presence of space charges in the present plasma polymer films is compatible with accepted mechanisms of plasma polymerization which involve reaction of ionic or radical-ionic species generated in the plasma. The plasma polymerized films are produced in an electret state which is quite stable with respect to time and environmental conditions, and the charge densities are comparable to those achieved in conventional polymeric electrets.

We claim:

1. In a device utilizing an electret, the improvement wherein the electret comprises a film of a plasma polymerized dielectric material having a substantially uniform volumetric space charge therethrough.

2. The improvement of claim 1 wherein said plasma polymerized dielectric material is made from hexamethyldisiloxane.

3. The improvement of claim 1, wherein the electret is formed from a hydrocarbon or halocarbon material.

4. The improvement of claim 1, wherein the electret comprises a multilayer laminate formed of different materials to have a desired property.

5. The improvement of claim 1, wherein said film has a thickness of between 100 Å and 25 μm.

6. The improvement of claim 1, wherein said plasma polymerized dielectric material is produced from an organosilicone.

7. A method of manufacturing an electret comprising the steps of providing a substrate, and depositing on said substrate a plasma polymerized material.

8. The method of claim 7, wherein the step of depositing said plasma polymerized material comprises the step of exposing said substrate to a plasma by a microwave plasma apparatus.

9. The method of claim 8, wherein said microwave plasma apparatus has a power density of between 0.01 to 10 watts per cm$^3$.

10. The method of claims 7 or 8, including the step of applying an external magnetic field.

11. The method of claim 7, including the step of electrically biasing said substrate.

12. A method of claim 7, 8, or 11, including the step of heating or cooling said substrate when the substrate is exposed to the plasma.

13. The method of claim 7, 8, or 11 including the further step of subjecting the plasma polymerized material to a corona discharge treatment, or electron beam charging.

14. The method of claims 7 or 11, wherein the film is plasma polymerized at a frequency of between 0 Hz and 30 GHz.

15. The method of claims 7, 8 or 11, wherein the film is plasma polymerized at a frequency of between 50 Hz and 10 GHz.

16. The method of claim 7, wherein the plasma polymerized material comprises a polar material.

17. The method of claim 16, further including the step of subjecting the plasma polymerized material to a polarization treatment at elevated temperature.

18. The method of claim 7, wherein said plasma polymerized material was produced from hexamethyldisiloxane.

19. In a transducer having a backplate and an electret adjacent thereto, the improvement wherein said electret comprises a film of a plasma polymerized dielectric material having a substantially uniform volumetric space charge therethrough.

20. In a transducer comprising a backplate, an electret on one side of said backplate, and a diaphragm, the improvement wherein said electret comprises a film of a plasma polymerized dielectric material having a substantially uniform volumetric space charge therethrough.

* * * * *